United States Patent
Wada et al.

(10) Patent No.: US 9,716,642 B2
(45) Date of Patent: Jul. 25, 2017

(54) SYSTEM AND METHOD FOR CHECKING ENTRY OF METER VALUE FROM LP GAS METER

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 15/025,183

(22) PCT Filed: Sep. 26, 2014

(86) PCT No.: PCT/JP2014/004945
§ 371 (c)(1),
(2) Date: Mar. 25, 2016

(87) PCT Pub. No.: WO2015/045406
PCT Pub. Date: Apr. 2, 2015

(65) Prior Publication Data
US 2016/0269262 A1     Sep. 15, 2016

(30) Foreign Application Priority Data
Sep. 27, 2013  (JP) ................................. 2013-201701

(51) Int. Cl.
*G06F 15/16*     (2006.01)
*H04L 12/26*     (2006.01)
(Continued)

(52) U.S. Cl.
CPC .............. *H04L 43/10* (2013.01); *G01D 3/10* (2013.01); *G01D 4/002* (2013.01);
(Continued)

(58) Field of Classification Search
CPC ......... G01D 4/002; H04L 67/12; H04L 47/24; H04L 45/125; H04L 45/12; H04L 43/10;
(Continued)

(56) References Cited

U.S. PATENT DOCUMENTS

| 9,143,885 B2 * | 9/2015 | Kimura .................... H04W 4/00 |
| 2005/0179561 A1 * | 8/2005 | Osterloh ................ G01D 4/004 340/870.02 |

(Continued)

FOREIGN PATENT DOCUMENTS

| JP | H06195585 | 7/1994 |
| JP | H09146979 | 11/1995 |

(Continued)

OTHER PUBLICATIONS

Canadian Office Action for corresponding Canadian Application No. 2925479 dated May 3, 2016, 4 pages.

(Continued)

*Primary Examiner* — Tauqir Hussain
(74) *Attorney, Agent, or Firm* — Lee & Hayes, PLLC

(57) ABSTRACT

An error input occurs in the meter indication value input of an LP gas meter. Whether the meter indication value input has an error input or not must be subjected to the determination by a responsible person. Since the meter indication value is used for delivery prediction for example, the business is enormously influenced by the error input. Thus, whether or not the meter indication value is a correct value is determined. When the inputted meter indication value is a correct value, then the meter indication value is stored in a predetermined data region as the latest meter indication value data. When the inputted meter indication value is a false value, the reentry of the meter indication value is prompted and the inputted meter indication value is cleared.

5 Claims, 6 Drawing Sheets

(51) Int. Cl.
  *G01D 3/10* (2006.01)
  *G01D 4/00* (2006.01)
  *H04L 29/06* (2006.01)
  *H04L 12/24* (2006.01)
  *H04L 29/08* (2006.01)
(52) U.S. Cl.
  CPC .......... *H04L 41/0866* (2013.01); *H04L 67/42* (2013.01); *H04L 67/12* (2013.01); *Y02B 90/241* (2013.01); *Y04S 20/32* (2013.01)
(58) Field of Classification Search
  CPC  H04W 4/005; H04W 28/0215; G05B 19/042; G01V 11/002
  USPC ........................................................ 709/203
  See application file for complete search history.

(56) References Cited

U.S. PATENT DOCUMENTS

| | | | | |
|---|---|---|---|---|
| 2006/0132330 | A1* | 6/2006 | Youn | H04Q 9/00 340/870.07 |
| 2008/0115141 | A1* | 5/2008 | Welingkar | G06F 9/5011 718/104 |
| 2012/0059591 | A1* | 3/2012 | Guglielmo | G05B 19/042 702/13 |
| 2013/0163520 | A1* | 6/2013 | Kimura | H04L 47/24 370/328 |
| 2013/0163597 | A1* | 6/2013 | Kimura | H04W 4/005 370/392 |
| 2013/0227138 | A1* | 8/2013 | Cai | H04W 12/08 709/225 |
| 2015/0324776 | A1* | 11/2015 | Wada | G06Q 50/06 705/40 |

FOREIGN PATENT DOCUMENTS

| | | |
|---|---|---|
| JP | H09320347 | 12/1996 |
| WO | WO2009123762 | 10/2009 |

OTHER PUBLICATIONS

PCT Interntaional Preliminary Report on Patentability for corresponding PCT Application No. PCT/JP2014/004945, dated Apr. 7, 2016, 5 pages plus English translation.

Canadian Office Action for corresponding Canadian Application No. 2925479 dated Nov. 14, 2016, 5 pages.

* cited by examiner

| METER COMPANY NUMBER | METER INDICATION VALUE | OPERATION DATE | RESPONSIBLE PERSON ID |
|---|---|---|---|
| PATK12345123456 | 19.3 | 2013/09/01 | 1234 |

FIG.5

| SUPPLY FACILITY ID | CAPACITY | CYLINDER COUNT | PREVIOUS DELIVERY DATE | PREVIOUS METER READING DATE | PREVIOUS SAFETY DATE | PREVIOUS METER INDICATION VALUE | METER COMPANY NUMBER |
|---|---|---|---|---|---|---|---|
| 00001 | 20 | 2 | 2013/09/01 | 2013/09/01 | 2013/06/15 | 19.3 | PATK1234512345456 |
| 00002 | 20 | 3 | 2013/08/30 | 2013/09/01 | 2013/08/01 | 14.5 | PATK2345123434567 |
| 00003 | 50 | 2 | 2013/08/15 | 2013/09/01 | 2013/07/25 | 23.1 | PATK3451234345678 |
| . . | . . | . . | . . | . . | . . | . . | . . |
| . . | . . | . . | . . | . . | . . | . . | . . |

FIG.6

SYSTEM AND METHOD FOR CHECKING ENTRY OF METER VALUE FROM LP GAS METER

TECHNICAL FIELD

The present invention relates to system and method for checking entry of meter value from LP gas meter.

BACKGROUND ART

LP gas is classified into imports from gas producing countries and domestic production including by-products from production processes of petroleum products. Import terminals where LP gas carried from gas producing countries by tankers is stored and petroleum refinery terminals are referred to as primary terminals. LP gas is loaded into domestic vessels or tank trucks at a primary terminal and shipped to secondary terminals that are transit stations for LP gas transportation which are located longshore or inland. Then, the LP gas carried to a secondary terminal is transported to LP gas filling stations in various locations (delivery bases), where gas cylinders are filled with the LP gas.

Gas cylinders filled at the respective delivery bases are delivered by a deliveryman to customer homes such as general households, collective housings, and business facilities. A used gas cylinder in a customer home is exchanged with a filled gas cylinder and is collected to a delivery base. Each delivery base is associated with a fixed delivery area for which a deliveryman is responsible. Based on a delivery list, each deliveryman visits customer homes within the delivery area and delivers a gas cylinder.

The delivery list is prepared by predicting the amount of LP gas remaining in the gas cylinder based on the past gas usage of the respective customers, the meter indication input result of the gas meter of a customer home (also may be referred to as a customer), and a delivery record for example to adjust a delivery due date (also may be referred to as delivery prediction) so as to prevent a gas shortage. The meter indication input of the gas meter is carried out by a deliveryman, a meter reader who periodically checks the usage, and a safety inspector who performs a safety inspection to visually check the gas meter to input the meter indication value to a mobile terminal carried by each of the above responsible personnel. The inputted meter indication value is collected from the mobile terminal and transmitted to a server computer and is used for delivery prediction.

However, the meter indication input is frequently carried out by using a soft keyboard on the mobile terminal, which causes an input error due to the depression of a wrong button for example. The inputted meter indication value can be checked by the mobile terminal. However, the meter indication input is very frequently carried out outside and thus the influence of rain or sweat for example prevents a responsible person from recognizing an error input. Furthermore, if a value significantly different from that of the gas usage of the previous month for example is inputted, an alert regarding a false value can be displayed. However, a significant change in the usage may be actually caused by a seasonal change (i.e., this change does not cause a false value). In this case, whether an error input is caused or not must be ultimately determined based on the determination by a responsible person. As described above, the inputted meter indication value is used in the subsequent delivery prediction for example, thus causing an error input to have a huge impact on the business.

The present invention has been made in view of the disadvantage as described above. It is an objective of the invention to provide a check system and a method that minimizes the error inputs during the input of the meter indication values of an LP gas meter.

SUMMARY OF INVENTION

In order to achieve the objective as described above, the present invention provides a method for checking a meter indication value input of an LP gas meter, comprising:

receiving, by a server computer, meter indication value data from a client computer;

determining, by the server computer, whether or not a meter indication value included in the meter indication value data is a correct value;

when the meter indication value is the correct value, storing, by the server computer, the meter indication value in a predetermined data region as the latest meter indication value data; and when the meter indication value is a false value, sending, by the server computer, to the client computer, data prompting the reentry of the meter indication value, wherein, when the client computer receives the data prompting the reentry, the client computer clears the inputted meter indication value.

The invention according to the above section further includes: receiving, by the server computer, the reentered meter indication value data from the client computer; and determining, by the server computer, whether or not the meter indication value included in the reentered meter indication value data is the correct value.

In the invention according to the above two sections, the method further includes:

receiving, by the server computer, the reentered meter indication value data from the client computer;

determining, by the server computer, whether or not the meter indication value included in the reentered meter indication value data is the same as the meter indication value determined as the false value; and when the meter indication value included in the reentered meter indication value data is the same as the meter indication value determined as the false value, storing, by the server computer, the meter indication value included in the reentered meter indication value data in a predetermined data region as the latest meter indication value data.

Advantageous Effects of Invention

As described above, the present invention can minimize the error inputs during the meter indication value input of an LP gas meter.

BRIEF DESCRIPTION OF DRAWINGS

FIG. 5 illustrates one example of data stored in a meter indication value data storage unit according to one embodiment of the present invention; and FIG. 6 illustrates one example of data stored in a facility data storage unit according to one embodiment of the present invention.

DESCRIPTION OF EMBODIMENTS

The following section will describe in detail a method and a system according to an embodiment of the present invention with reference to the attached drawings.

Figure 1:
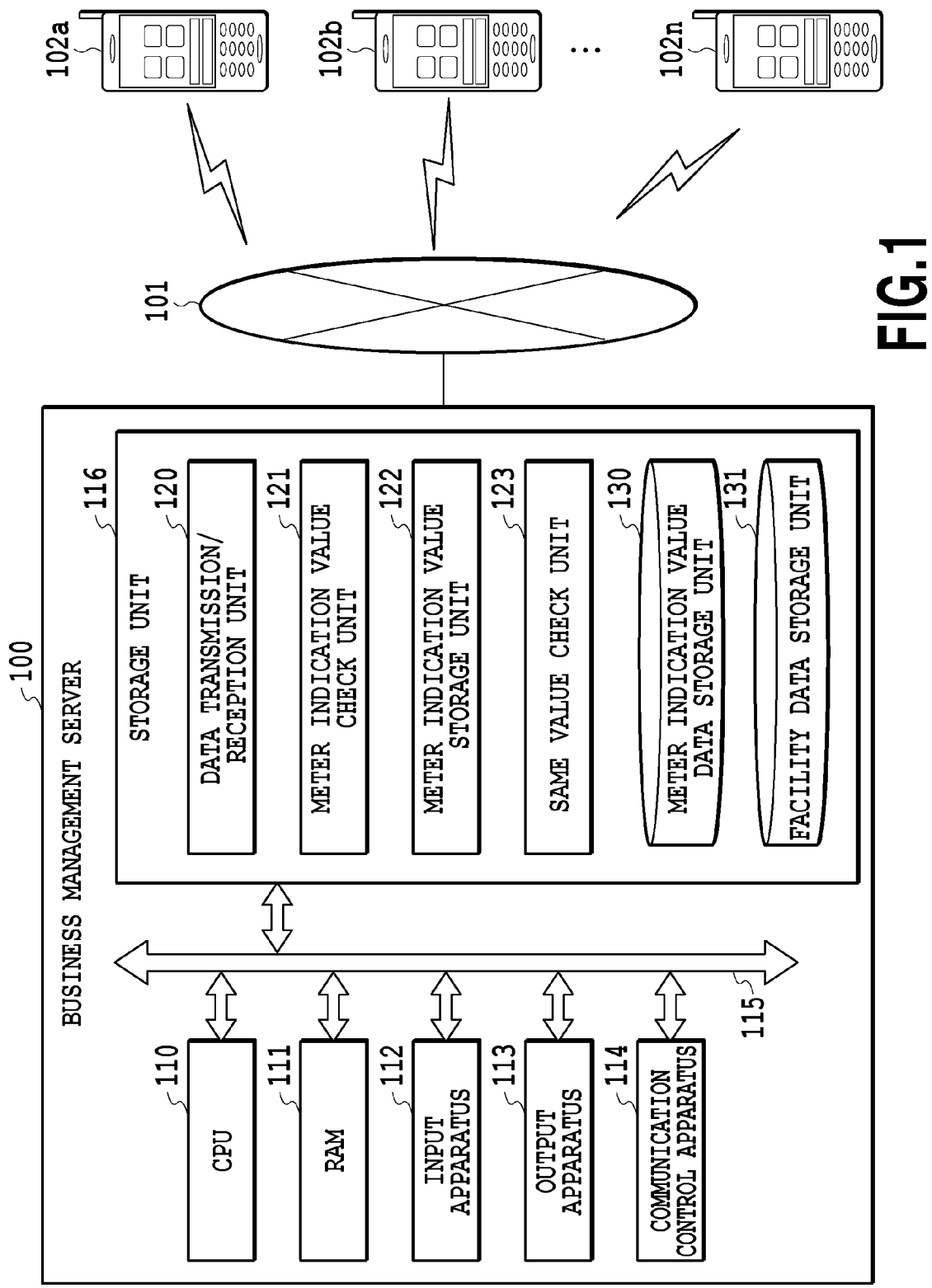
FIG. 1 illustrates a system configuration according to one embodiment of the present invention.

FIG. 1 illustrates a system configuration according to one embodiment of the present invention. In FIG. 1, a business management server 100 provided in a data center for example is configured to communicate, via a network 101, with a plurality of mobile terminals 102a, 102b, 102n (hereinafter referred to as "the mobile terminal 102"). The mobile terminal 102 is carried by an operation-responsible person (a deliveryman, a meter reader, and a safety inspector will be hereinafter referred to as an "operation-responsible person").

A gas meter provided at an operation site has a label adhered thereto and includes a two-dimensional code (e.g., QR code (registered trademark)) in which data regarding a gas meter facility is embedded. The operation-responsible person in the operation site reads the two-dimensional code using the mobile terminal 102. The operation-responsible person reads, from the gas meter, a meter indication value showing the amount of LP gas remaining in the gas cylinder to input the meter indication value to the mobile terminal 102.

The inputted meter indication value is sent from the mobile terminal 102 to the business management server 100. The business management server 100 determines whether the received meter indication value is a false value or not. When the received meter indication value is a correct value, the business management server 100 stores the received meter indication value in a predetermined data region as the latest meter indication value data. When the received meter indication value is a false value on the other hand, the business management server 100 sends, to the mobile terminal 102, data prompting the reentry of the meter indication value.

When the mobile terminal 102 receives the data prompting the reentry of the meter indication value, the details are displayed on a screen of the mobile terminal 102. Then, the operation-responsible person reads the meter indication value again from the gas meter to input the meter indication value to a mobile terminal 102. The reentered meter indication value is retransmitted from the mobile terminal 102 to the business management server.

The business management server 100 directly stores the again-received meter indication value in a predetermined data region as a correct value or subjects the value to a recheck processing.

Next, the following section will describe in detail the configuration of the business management server 100 of FIG. 1.

The business management server 100 has a configuration in which a CPU 110 is connected via a system bus 115 to a storage unit 116 composed of a RAM 111, an input apparatus 112, an output apparatus 113, a communication control apparatus 114, and a nonvolatile storage medium (e.g., ROM or HDD). The storage unit 116 includes a program storage region that stores software programs to provide the respective functions according to the present invention and a data storage region that stores data used or prepared by the software programs. The respective units of the program storage region (which will be described later) are actually independent software programs or the routines or components thereof for example. They are called by the CPU 110 from the storage unit 116, are developed into the work area of the RAM 111, and are sequentially executed to thereby provide the respective functions.

The data storage region in the business management server 100 includes components related to the present invention such as a meter indication value data storage unit 130 and a facility data storage unit 131, any of which is a fixed storage region secured in the storage unit 116.

The meter indication value data storage unit 130 stores data related to the meter indication value read from the gas meter by the operation-responsible person. In one embodiment, this data is data as shown in FIG. 5. The meter indication value data in FIG. 5 stores the "Meter company number" uniquely representing the gas meter, the "meter indication value" representing the read meter indication value, the "operation date" as a date at which the operation is performed, and the "responsible person ID" uniquely representing the operation-responsible person. The term "Meter company number" is, for example, a fixed-length code obtained by combining a "manufacturer code", a "model code", and a "model number".

The facility data storage unit 131 stores data related to the facility data. In one embodiment, this data is data as shown in FIG. 6. The facility data in FIG. 6 stores the "supply facility ID" uniquely representing the supply facility (e.g., a gas cylinder), the "capacity" showing the capacity of the supply facility, the "cylinder count" showing the number of supply facility or supply facilities, the "previous delivery date" showing the date at which LP gas was previously delivered, the "meter reading date" showing the meter was previously read, the "previous safety date" showing the date at which a previous safety operation was carried out, the "previous meter indication value" showing the LP gas remaining amount of the supply facility read during the previous operation (delivery, meter reading, or safety operation), and the "Meter company number". The "capacity" is based on a unit of kg (kilogram) for example. The "previous meter indication value" is based on a unit of lube ($m^3$) for example.

Next, software programs stored in the program storage region in the business management server 100 include components related to the present invention such as a data transmission/reception unit 120, a meter indication value check unit 121, a meter indication value storage unit 122, and a same value check unit 123.

The data transmission/reception unit 120 exchanges data with the mobile terminal 102. For example, the data transmission/reception unit 120 receives meter indication value data from the mobile terminal 102 and stores the meter indication value data into the meter indication value data storage unit 130. When the received meter indication value data is determined to be false, the data transmission/reception unit 120 sends, to the mobile terminal 102, data prompting the reentry of the meter indication value.

The meter indication value check unit 121 determines whether the meter indication value received from the mobile terminal 102 has a false value or not. If the received meter indication value is a correct value, the meter indication value storage unit 122 stores the received meter indication value in the facility data storage unit 131 as the latest meter indication value data.

The same value check unit 123 determines whether or not the reentered meter indication value is identical with the meter indication value determined as a false value. This determination functions to redetermine, even when the meter indication value is determined as a false value, that the meter indication value is a correct value if a perfectly identical value is reentered. For example, the same value check unit 123 is configured to cope with a significant change of the usage due to a seasonal change.

Figure 2:
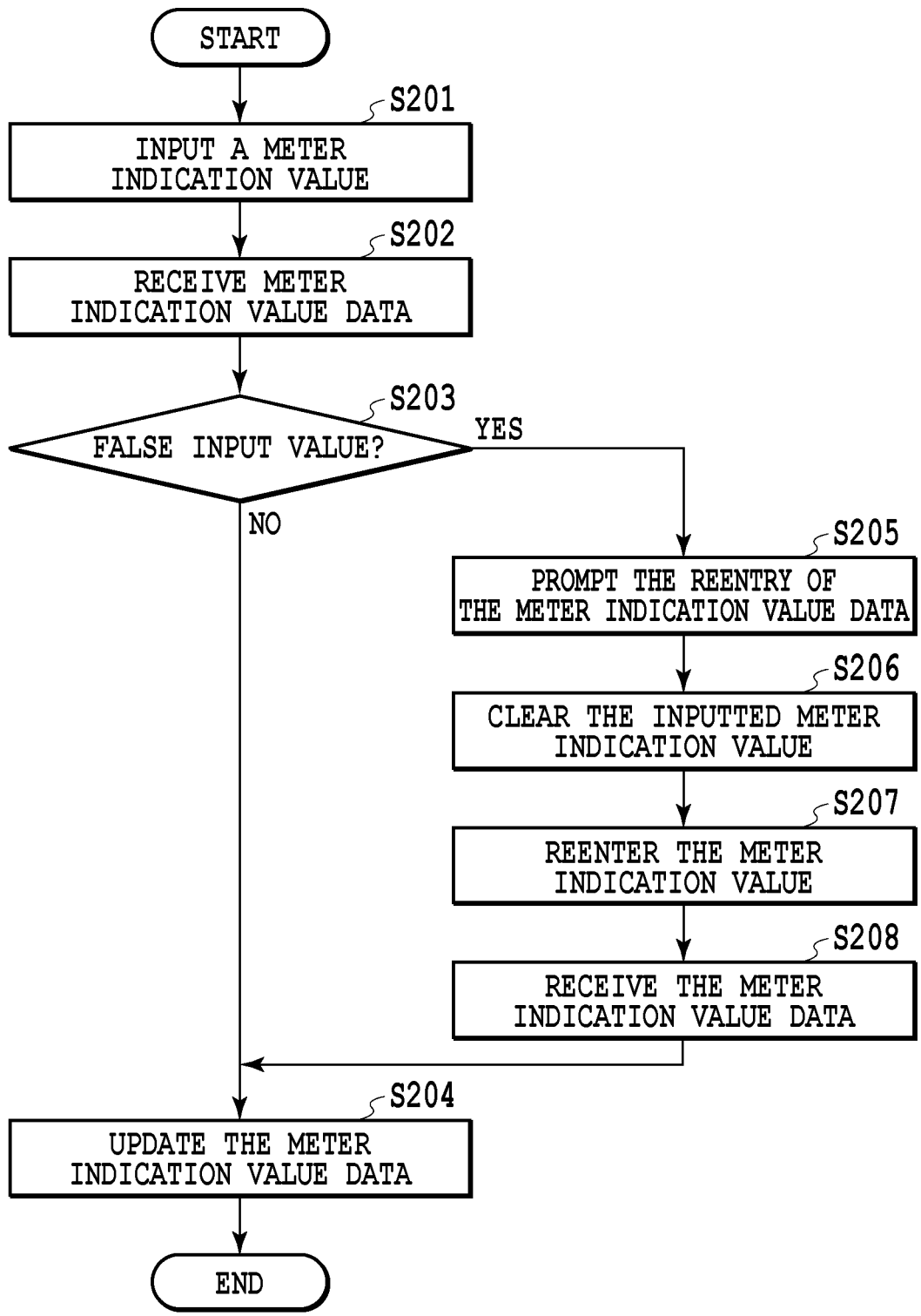
FIG. 2 is a flowchart illustrating the meter indication value input of an LP gas meter check processing (without recheck) according to one embodiment of the present invention.

Next, with reference to the flowchart of FIG. 2 as well as the tables of FIGS. 5 and 6, the following section will describe in detail the processing according to one embodiment of the present invention.

FIG. 2 is a flowchart illustrating the LP gas meter indication value input check processing (without recheck) according to one embodiment of the present invention. In Step 201, an operation-responsible person inputs a meter indication value read from the gas meter to the mobile terminal 102. In Step 202, the data transmission/reception unit 120 receives the meter indication value data (FIG. 5) sent from the mobile terminal 102.

Upon receiving the meter indication value data, the meter indication value check unit 121 determines whether or not the received meter indication value is a false value (Step 203). This determination is carried out for each supply facility based on the past usage or the usage pattern for example. In one embodiment, if (a difference between the previous meter indication value and the current meter indication value) based on the "previous meter indication value" of the facility data (FIG. 6) is within a fixed usage range, then the meter indication value is determined as a correct value. The meter indication value check unit 121 also can check an obvious error input (e.g., a value having a digit number exceeding that displayed on the meter, a negative value). The meter indication value check unit 121 also can determine that the meter indication value is a false value when the current meter indication value is lower than the previous meter indication value regardless of the fact that the cock is closed (or the gas supply is stopped).

When the received meter indication value is determined as a correct value in Step 203, then the processing proceeds to a No route where the meter indication value storage unit 122 stores the received meter indication value in the "previous meter indication value" of the facility data (FIG. 6) as the latest meter indication value data. During the storage, depending on the type of the operation, the meter indication value storage unit 122 also can update any of the "previous distribution date", the "previous meter reading date", and the "previous safety date" of the facility data (FIG. 6). The type of the operation can be determined from the data (not shown) associated with the "responsible person ID" included in the meter indication value data (FIG. 5) or also can be received from the mobile terminal 102 by being included in the meter indication value data. After Step 204, this processing is completed.

If the meter indication value received in Step 203 is determined as a false value on the other hand, the processing proceeds to a Yes route where the data transmission/reception unit 120 sends, to the mobile terminal 102, the data prompting the reentry of the meter indication value (Step 205).

When the mobile terminal 102 receives the data prompting the reentry of the meter indication value, the mobile terminal 102 clears the inputted meter indication value (Step 206). This is to prevent the inputted meter indication value from being retransmitted directly and also can prevent the erroneous operation of a retransmission button.

In Step 207, the operation-responsible person rechecks the meter indication value of the gas meter and reenters the read meter indication value to the mobile terminal 102. In Step 208, the data transmission/reception unit 120 receives the meter indication value data (FIG. 5) retransmitted from the mobile terminal 102.

Upon receiving the meter indication value data again, the meter indication value storage unit 122 stores the received meter indication value in the "previous meter indication value" of the facility data (FIG. 6) (Step 204). After Step 204, this processing is completed. The reason why the again-received meter indication value is not subjected to the determination regarding a false value is that the prompted reentry would result in the input of a correct value. This also aims to cope with a significant change of the usage due to a seasonal change for example (i.e., to cope with a case where a value determined as a false value is actually a correct value). As described above, a processing pattern when no recheck is performed was described. Next, a processing pattern involving a recheck will be described.

Figure 3:
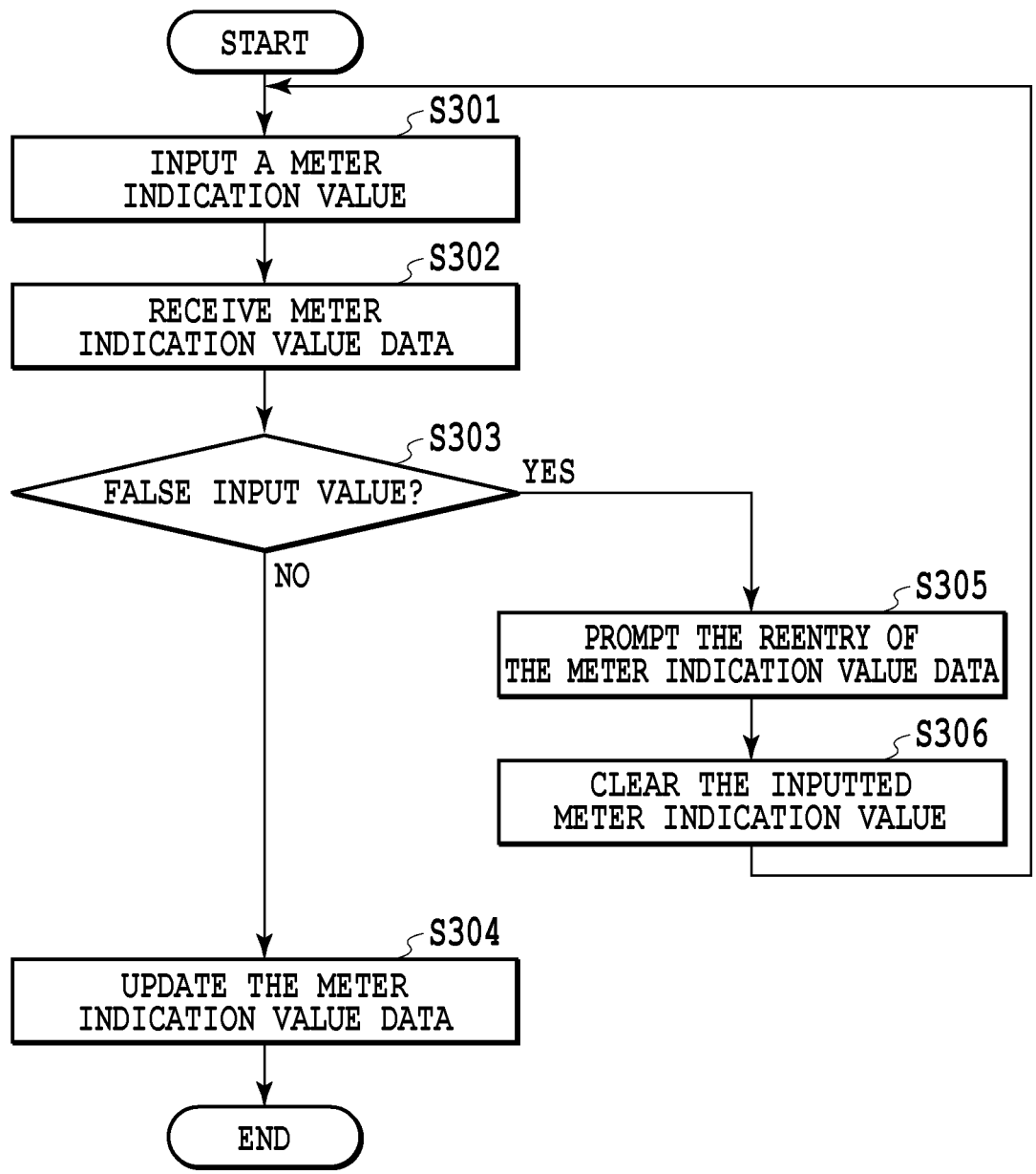
FIG. 3 is a flowchart illustrating the meter indication value input of an LP gas meter check processing (with recheck) according to one embodiment of the present invention.

FIG. 3 is a flowchart illustrating the meter indication value input of an LP gas meter check processing (with recheck) according to one embodiment of the present invention. Steps 301 to 306 in FIG. 3 are the same as Steps 201 to 206 in FIG. 2. The processing in FIG. 3 is different from the processing in FIG. 2 in that the inputted meter indication value cleared in Step 306 is subsequently returned to Step 301 to thereby recheck the reentered meter indication value in Step 303. This can consequently provide a more robust check of a false input. On the other hand, some criteria to determine a false value may cause an overstrict check when a seasonal change for example causes a significant change of the usage.

Figure 4:
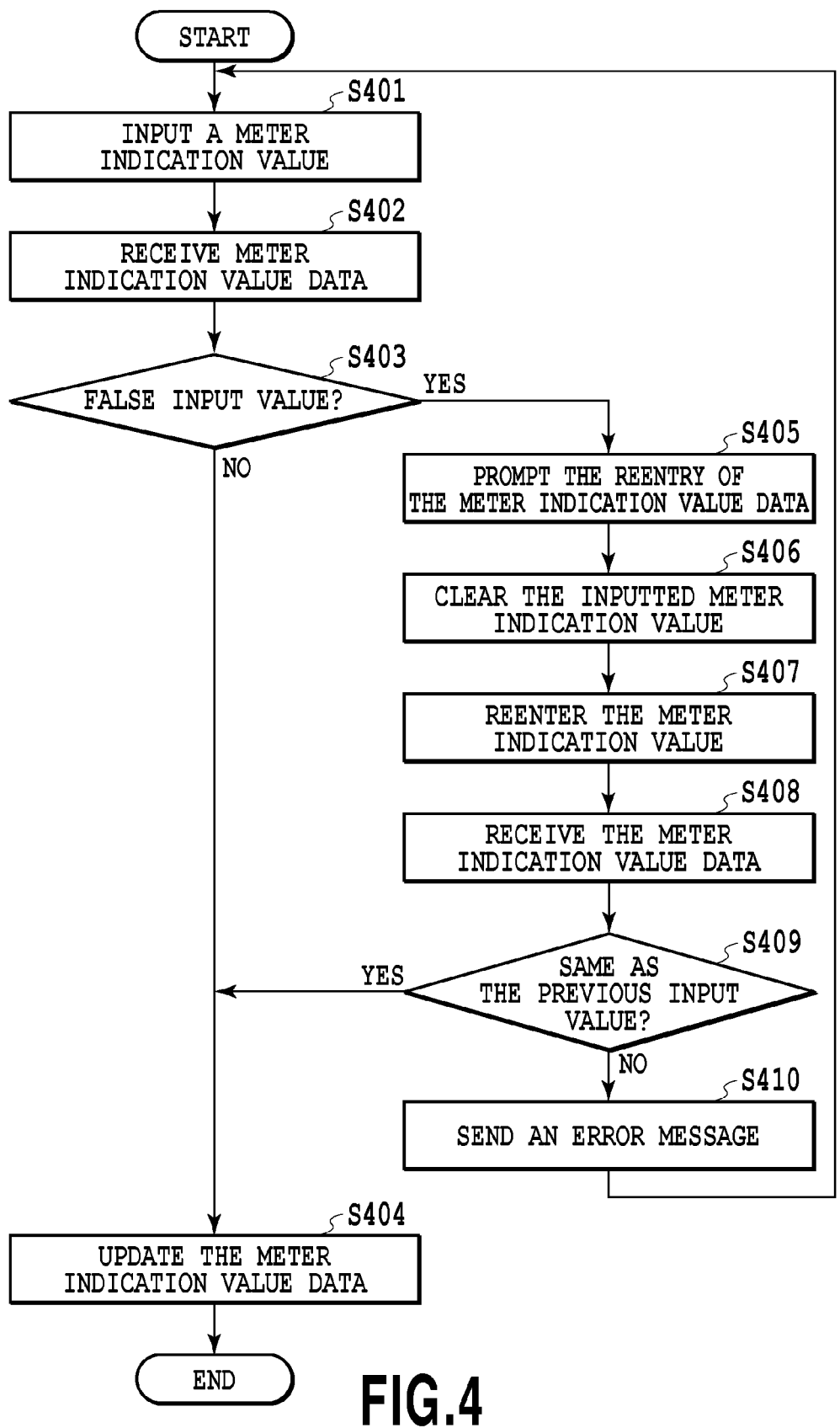
FIG. 4 is a flowchart illustrating the meter indication value input of an LP gas meter check processing (with the same value check) according to one embodiment of the present invention.

FIG. 4 is a flowchart illustrating the meter indication value input check processing of an LP gas meter (with the same value check) according to one embodiment of the present invention. Steps 401 to 408 of FIG. 4 are the same as Steps 201 to 208 in FIG. 2. A difference therebetween is that, according to the processing in FIG. 4, when the data transmission/reception unit 120 in Step 408 receives the meter indication value data (FIG. 5) retransmitted from the mobile terminal 102, the same value check unit 123 determines whether or not the received meter indication value is the same as the meter indication value (the previous input value) determined as a false value (Step 409). This is based on a concept that, when a value determined as a false value is inputted two times, this value determined as a false value can be determined as a correct value.

When the received meter indication value is determined as the same as the previous input value in Step 409, the processing proceeds to the Yes route in which the meter indication value storage unit 122 stores the received meter indication value in the "previous meter indication value" of the facility data (FIG. 6) (Step 404).

When the received meter indication value is determined as the same as the previous input value in Step 409 on the other hand, the processing proceeds to the No route in which the data transmission/reception unit 120 sends an error message to the mobile terminal 102 (Step 410). In this case, all of the processings are redone from Step 401. It is noted that the transmission of the error message in Step 410 may be substituted with the transmission of a confirmation message from the data transmission/reception unit 120 to the mobile terminal 102 to determine whether or not the meter indication value data is stored.

The invention claimed is:

1. A method for checking a meter indication value input of a gas meter, comprising:
   receiving, by a server computer, meter indication value data for the gas meter which was input by an operation-responsible person from a client computer;
   determining, by the server computer, whether or not a meter indication value included in the meter indication value data is a correct value in a predetermined range based on past usage and a supply status for a supply facility associated with the gas meter which were input by the operation-responsible person or other operation-responsible person via each client computer;
   when the meter indication value is the correct value, storing, by the server computer, the meter indication value in a predetermined data region as the latest meter indication value data;
   when the meter indication value is a false value, sending, by the server computer, to the client computer, data prompting a reentry of the meter indication value, wherein, when the client computer receives the data prompting the reentry, the client computer clears the inputted meter indication value;
   receiving, by the server computer, the reentered meter indication value data from the client computer;
   determining, by the server computer, whether or not the meter indication value included in the reentered meter indication value data is the same as the meter indication value determined as the false value; and
   when the meter indication value included in the reentered meter indication value data is the same as the meter indication value determined as the false value, storing, by the server computer, the meter indication value included in the reentered meter indication value data in a predetermined data region as the latest meter indication value data.

2. The method according to claim 1, further comprising:
   receiving, by the server computer, the reentered meter indication value data from the client computer; and
   determining, by the server computer, whether or not the meter indication value included in the reentered meter indication value data is the correct value.

3. A server computer for checking a meter indication value input of a gas meter, the server computer being configured to:
   receive meter indication value data for the gas meter which was input by an operation-responsible person from a client computer;
   determine whether or not a meter indication value included in the meter indication value data is a correct value in a predetermined range based on past usage and a supply status for a supply facility associated with the gas meter which were input by the operation-responsible person or other operation-responsible person via each client computer;
   when the meter indication value is the correct value, store the meter indication value in a predetermined data region as the latest meter indication value data;
   when the meter indication value is a false value, send, to the client computer, data prompting a reentry of the meter indication value, wherein, when the client computer receives the data prompting the reentry, the client computer clears the inputted meter indication value;
   receive the reentered meter indication value data from the client computer;
   determine whether or not the meter indication value included in the reentered meter indication value data is the same as the meter indication value determined as the false value; and
   when the meter indication value included in the reentered meter indication value data is the same as the meter indication value determined as the false value, store the meter indication value included in the reentered meter indication value data in a predetermined data region as the latest meter indication value data.

4. A client computer for checking a meter indication value input of a gas meter, wherein the client computer being configured to:
   send meter indication value data for the gas meter which was input by an operation-responsible person to a server computer;
   receive, from the server computer, data prompting a reentry of a meter indication value, wherein the data prompting the reentry is sent to the client computer when the server computer determines that a meter indication value included in the meter indication value data is not a correct value in a predetermined range based on past usage and a supply status for a supply facility associated with the gas meter which were input by the operation-responsible person or other operation-responsible person via each client computer;
   clear the inputted meter indication value when receiving the data prompting the reentry
   send, to the server computer, the reentered meter indication value data;
   cause the server computer to determine whether or not the meter indication value included in the reentered meter indication value data is the same as the meter indication value determined as the false value; and
   when the meter indication value included in the reentered meter indication value data is the same as the meter indication value determined as the false value, cause the server computer to store the meter indication value included in the reentered meter indication value data in a predetermined data region as the latest meter indication value data.

5. A non-transitory computer-readable storage medium storing a computer-executable instruction for executing a method of checking a meter indication value input of a gas meter, wherein the method comprising:
   receiving, by a server computer, meter indication value data for the gas meter which was input by an operation-responsible person from a client computer;
   determining, by the server computer, whether or not a meter indication value included in the meter indication value data is a correct value in a predetermined range based on past usage and a supply status for a supply facility associated with the gas meter which were input by the operation-responsible person or other operation-responsible person via each client computer;
   when the meter indication value is the correct value, storing, by the server computer, the meter indication value in a predetermined data region as the latest meter indication value data;
   when the meter indication value is a false value, sending, by the server computer, to the client computer, data prompting a reentry of a meter indication value, wherein, when the client computer receives the data prompting the reentry, the client computer clears the inputted meter indication value;
   receiving, by the server computer, the reentered meter indication value data from the client computer;

determining, by the server computer, whether or not the meter indication value included in the reentered meter indication value data is the same as the meter indication value determined as the false value; and when the meter indication value included in the reentered meter indication value data is the same as the meter indication value determined as the false value, storing, by the server computer, the meter indication value included in the reentered meter indication value data in a predetermined data region as the latest meter indication value data.

\* \* \* \* \*